(12) United States Patent
Watanabe et al.

(10) Patent No.: US 10,012,803 B2
(45) Date of Patent: Jul. 3, 2018

(54) OPTICAL FIBER BUNDLE STRUCTURE AND OPTICAL FIBER CONNECTION STRUCTURE

(71) Applicant: FURUKAWA ELECTRIC CO., LTD., Tokyo (JP)

(72) Inventors: Kengo Watanabe, Tokyo (JP); Tsunetoshi Saito, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/501,395

(22) PCT Filed: Aug. 4, 2015

(86) PCT No.: PCT/JP2015/072068
§ 371 (c)(1),
(2) Date: Feb. 2, 2017

(87) PCT Pub. No.: WO2016/021589
PCT Pub. Date: Feb. 11, 2016

(65) Prior Publication Data
US 2017/0235061 A1  Aug. 17, 2017

(30) Foreign Application Priority Data

Aug. 8, 2014  (JP) .................. 2014-162169

(51) Int. Cl.
*G02B 6/38* (2006.01)
*G02B 6/02* (2006.01)
(Continued)

(52) U.S. Cl.
CPC ....... *G02B 6/3885* (2013.01); *G02B 6/02042* (2013.01); *G02B 6/04* (2013.01); *G02B 6/4202* (2013.01)

(58) Field of Classification Search
CPC .... G02B 6/3885; G02B 6/02042; G02B 6/04; G02B 6/4202
(Continued)

(56) References Cited

U.S. PATENT DOCUMENTS

2007/0278666 A1* 12/2007 Garcia ................ G02B 6/4202
257/707
2009/0092356 A1* 4/2009 Yasuda et al. ....... G02B 6/4214
385/31
(Continued)

FOREIGN PATENT DOCUMENTS

JP  62-047604  3/1987
JP  08286081 A * 11/1996 ............... G02B 6/40
(Continued)

OTHER PUBLICATIONS

International Search Report issued in PCT Patent Application No. PCT/JP2015/072068 dated Sep. 15, 2015.
(Continued)

*Primary Examiner* — Jerry Blevins
(74) *Attorney, Agent, or Firm* — Marshall, Gerstein & Borun LLP

(57) ABSTRACT

This optical fiber connection structure connects a multicore fiber and a bundle structure bundling a plurality of optical fibers. The multicore fiber has a plurality of cores arranged in a lattice. The bundle structure includes closely packed optical fibers of the same diameter. The bundle structure is configured such that signal light optical fiber groups including signal light optical fibers and a dummy fiber group including dummy optical fibers are stacked in multiple layers. The signal light optical fiber groups are configured with the signal light optical fibers aligned in the mutually contacting direction. The signal light optical fiber groups and the dummy fiber group are stacked orthogonal to the
(Continued)

alignment direction of the optical fibers constituting the respective fiber groups.

6 Claims, 10 Drawing Sheets

(51) Int. Cl.
    *G02B 6/04*     (2006.01)
    *G02B 6/42*     (2006.01)

(58) Field of Classification Search
    USPC .......................................................... 385/55
    See application file for complete search history.

(56) References Cited

U.S. PATENT DOCUMENTS

| | | | |
|---|---|---|---|
| 2011/0176776 A1* | 7/2011 | Imamura | G02B 6/02042 |
| | | | 385/59 |
| 2014/0010501 A1 | 1/2014 | Saito et al. | |

FOREIGN PATENT DOCUMENTS

| | | |
|---|---|---|
| JP | H08-286081 A | 11/1996 |
| JP | 2011-145562 A | 7/2011 |
| WO | WO-2012/121320 A1 | 9/2012 |

OTHER PUBLICATIONS

Office Action issued in Japanese Patent Application No. 2016-540243 dated Nov. 22, 2016.
Watanabe et al., "Fiber bundle type fan-out for 2×4 multicore fiber," *IEICE Communications Society Conference* 2014, (Sep. 9, 2014).

* cited by examiner

OPTICAL FIBER BUNDLE STRUCTURE AND OPTICAL FIBER CONNECTION STRUCTURE

TECHNICAL FIELD

This present disclosure relates to an optical fiber bundle structure and the like that can be connected with a multicore fiber, which includes cores arranged in a lattice, and the like.

BACKGROUND

Due to rapidly increasing traffic in optical communications in recent years, the transmission capacity of presently used single-core optical fibers is approaching its limit. So, as a means to further expand the communication capacity, multicore fibers in which a plurality of cores are formed in one fiber have been proposed.

When a multi-core fiber is used as a transmission path, each of the core parts of the multicore fiber needs to be connected to corresponding core parts of another multicore fiber, other optical fibers, an optical element, or the like respectively to send and/or receive transmission signals. As a method for connecting such a multicore fiber and a single core fiber, Patent Document 1 discloses a method in which a multicore fiber is connected with a bundle fiber, in which single core optical fibers are arranged at the positions corresponding to the core parts of the multicore fiber, to send and/or receive transmission signals.

Meanwhile, multicore fibers having cores arranged in a plurality of rows as a lattice for a use in data centers and the like, for example, have been suggested. Thus, a fan out mechanism that can be connected to such multicore fibers has been in demand.

As a fan out mechanism, there is a method in which a multi-hole capillary having multiple-string holes is used, for example. An optical fiber is inserted into each of the holes of the capillary and fixed so that the optical fibers can be arranged at predetermined positions.

However, in such a multi-hole capillary, there may be some variations in hole diameter and hole pitch of about ±2 to 3 μm. This precludes realization of the required dimension accuracy (±1 μm or less) of the hole positions and the like.

Also, since it is difficult to make the outer diameter of a multicore fiber too large for issues such as bending allowance, it is necessary that the pitch of the cores in the multicore fiber is as narrow as approximately 40 to 50 μm. However, the thickness of the wall between adjacent holes in a multi-hole capillary is required to be 20 μm at the minimum, and thus, taking the wall thickness into consideration, the hole diameter is required to be approximately 20 to 30 μm. Thus, the diameter of the fiber to be used must be equal to or less than the hole diameter. However, such an optical fiber with a thin diameter is too thin and is difficult to handle with.

SUMMARY OF THE DISCLOSURE

The presently described embodiments were achieved in view of such problems. Its object is to provide an optical fiber bundle structure and the like that can be connected with a multicore fiber, which includes cores arranged in a lattice, and the like.

To achieve the above object, a first embodiment is an optical fiber bundle structure including a plurality of optical fibers and a capillary that holds a plurality of the optical fibers. The optical fiber includes a signal light optical fiber and a dummy fiber having the same diameter as the signal light optical fiber, and the dummy fiber is shorter than the signal light optical fiber. When the optical fibers are disposed in a close-packed arrangement at a cross section in a diameter direction of the optical fiber bundle structure, and a direction in which adjacent optical fibers are in contact with each other is an X direction and a direction that is perpendicular to the X direction is a Y direction, a signal light optical fiber group, in which a plurality of the optical fibers including the signal light optical fibers are aligned in the X direction, and a dummy fiber group, in which a plurality of the dummy fibers are aligned in the X direction, are stacked in multiple layers respectively in the Y direction.

If a shape of a hole of the capillary is substantially rectangular, a width a of the hole may satisfy a relation:

$$n_h \cdot d \leq a < (n_h + \frac{1}{2}) \cdot d$$

and a height b of the hole may satisfy a relation:

$$(((n_v-1) \cdot (3^{(1/2)})/2)+1) \cdot d \leq b < (((n_v \cdot (3^{(1/2)}))/2)+1) \cdot d$$

wherein d represents a diameter of the optical fiber, $n_h$ represents the maximum number of the optical fibers aligned in the X direction in each row, and $n_v$ represents a total number of rows of the signal light optical fiber groups and the dummy fiber groups stacked in the Y direction, and the X direction of the optical fiber bundle structure corresponds to a width direction of the hole and the Y direction of the optical fiber bundle structure corresponds to a height direction of the hole.

If the shape of the hole of the capillary is substantially elliptical, a length a of the hole in a longitudinal direction may satisfy a relation:

$$n_h \cdot d \leq a < (n_h + \frac{1}{2}) \cdot d$$

and a length b of the hole in a short end direction may satisfy a relation:

$$(((n_v-1) \cdot (3^{(1/2)})/2)+1) \cdot d \leq b < (((n_v \cdot (3^{(1/2)}))/2)+1) \cdot d$$

wherein d represents a diameter of the optical fiber, $n_h$ represents the maximum number of the optical fibers aligned in the X direction in each row, and $n_v$ represents a total number of rows of the signal light optical fiber groups and the dummy fiber groups stacked in the Y direction, and the X direction of the optical fiber bundle structure corresponds to the longitudinal direction of the hole and the Y direction of the optical fiber bundle structure corresponds to the short end direction of the hole.

The optical fiber bundle structure may be in a substantially hexagon shape including nineteen of the optical fibers disposed in a close-packed arrangement. The shape of the hole of the capillary may be substantially circular, and D may be in a range of:

$$5d \leq D < 5.5d$$

wherein D represents an hole diameter.

The optical fiber bundle structure may be in a substantially hexagon shape including thirty seven of the optical fibers disposed in a close-packed arrangement. The shape of the hole of the capillary may be substantially circular, and D may be in a range of:

$$7d \leq D < 7.4d$$

wherein D represents the hole diameter.

The signal light optical fiber group may include the signal light optical fibers and the dummy fibers, and the signal light optical fibers may be disposed at predetermined intervals in the X direction.

According to the first embodiment, signal light optical fiber groups and dummy fiber groups are stacked in layers with signal light optical fibers in the signal light optical fiber group being disposed in the alignment direction (the X direction) of the optical fibers as well as in the direction perpendicular to the same (the Y direction) so that the signal light optical fibers can be arranged in a lattice. Thus, the optical fiber bundle structure according to the first embodiment can be optically connected with a multicore fiber or a light receiving/emitting element having a lattice-shaped core arrangement.

Also, on this occasion, since a multi-hole capillary is not used, it is unnecessary to consider the wall thickness between holes and thus the diameter of the signal light optical fiber can be substantially matched with the core pitch. For this reason, the presently described embodiments excel in handling of the signal light optical fibers and the like.

In addition, when the bundle structure is inserted into a capillary having a rectangular, elliptical, or circular hole, the dimension of each hole is optimized so as to prevent the optical fibers forming the bundle structure from moving within the hole.

In addition, when the signal light optical fiber group includes signal light optical fibers and dummy fibers with dummy fibers being disposed between signal light optical fibers, the scope of application of the presently described embodiments can be extended in terms of a relation between the pitch in the Y direction and the pitch in the X direction of the signal light optical fibers.

A second embodiment is an optical fiber connection structure connecting a multicore fiber and an optical fiber bundle structure. The multicore fiber includes a plurality of cores and the cores are disposed at predetermined intervals in an H direction and are also disposed at predetermined intervals in a V direction, which is approximately perpendicular to the H direction, in a lattice. The optical fiber bundle structure includes a plurality optical fibers and a capillary that holds a plurality of the optical fibers. The optical fibers include signal light optical fibers and dummy fibers having the same diameter as the signal light optical fibers. When the optical fibers are disposed in a close-packed arrangement at a cross section in a diameter direction of the optical fiber bundle structure, and a direction in which adjacent optical fibers are in contact with each other is an X direction and a direction that is perpendicular to the X direction is a Y direction, a signal light optical fiber group, in which a plurality of the optical fibers including the signal light optical fibers are aligned in the X direction, and a dummy fiber group, in which a plurality of the dummy fibers are aligned in the X direction, are stacked in multiple layers respectively in the Y direction, and the cores of the multicore fiber are optically connected with cores of the signal light optical fibers in the signal light optical fiber group by corresponding the X direction with the H direction as well as corresponding the Y direction with the V direction.

Another embodiment is an optical fiber connection structure connecting a light receiving/emitting element and an optical fiber bundle structure. The light receiving/emitting element includes a plurality of light receiving/emitting portions and the light receiving/emitting portions are disposed at predetermined intervals in an H direction and are also disposed at predetermined intervals in a V direction, which is approximately perpendicular to the H direction, in a lattice. The optical fiber bundle structure includes a plurality optical fibers and a capillary that holds a plurality of the optical fibers. The optical fibers include signal light optical fibers and dummy fibers having the same diameter as the signal light optical fibers. When the optical fibers are disposed in a close-packed arrangement at a cross section in a diameter direction of the optical fiber bundle structure, and a direction in which adjacent optical fibers are in contact with each other is an X direction and a direction that is perpendicular to the X direction is a Y direction, a signal light optical fiber group, in which a plurality of the optical fibers including the signal light optical fibers are aligned in the X direction, and a dummy fiber group, in which a plurality of the dummy fibers are aligned in the X direction, are stacked in multiple layers respectively in the Y direction, and the light receiving/emitting portions of the light receiving/emitting element are optically connected with cores of the signal light optical fibers in the signal light optical fiber group by corresponding the X direction with the H direction as well as corresponding the Y direction with the V direction.

The second embodiment enables a multicore fiber having cores in a lattice shape or a light receiving/emitting element having light receiving/emitting portions in a lattice shape to fan out efficiently.

The presently described embodiments can provide an optical fiber bundle structure and the like that can be connected with a multicore fiber, which includes cores arranged in a lattice, and the like.

BRIEF DESCRIPTION OF DRAWINGS

FIG. 6 is a cross sectional view showing a bundle structure 5a.

FIG. 9 is a drawing showing an optical fiber connection structure 1a.

DETAILED DESCRIPTION

Figure 1:
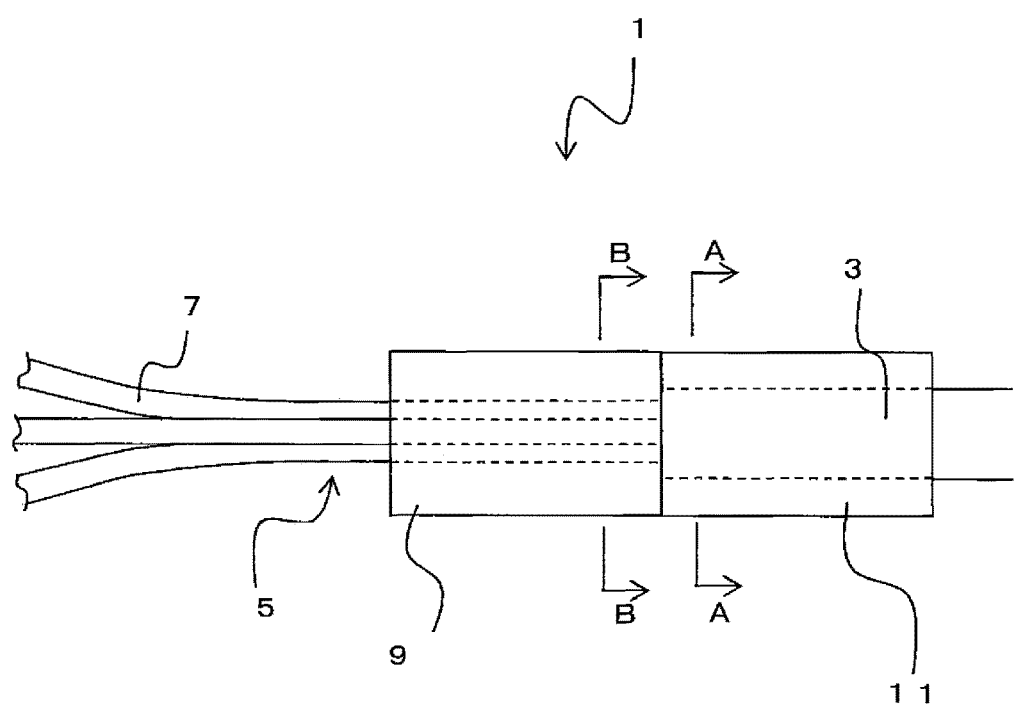
FIG. 1 is a drawing showing an optical fiber connection structure 1.
Figure 2A:
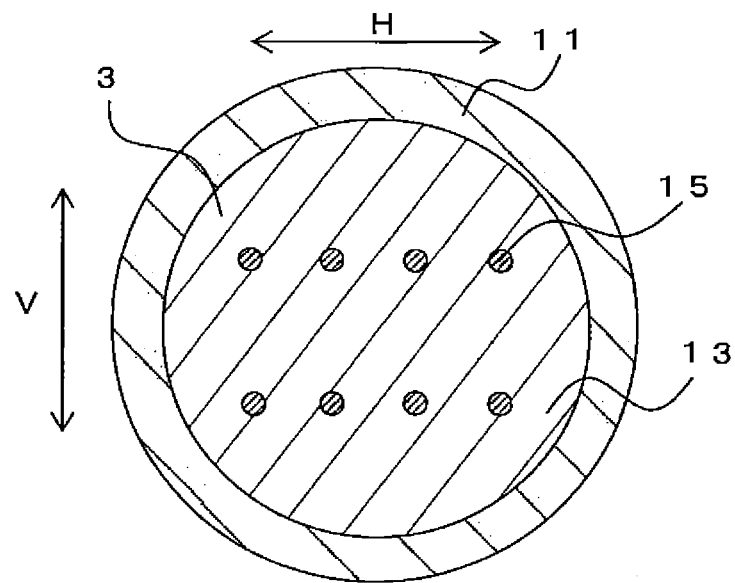
FIG. 2a is a cross sectional view showing the optical fiber connection structure 1 taken along the line A-A of FIG. 1.
Figure 2B:
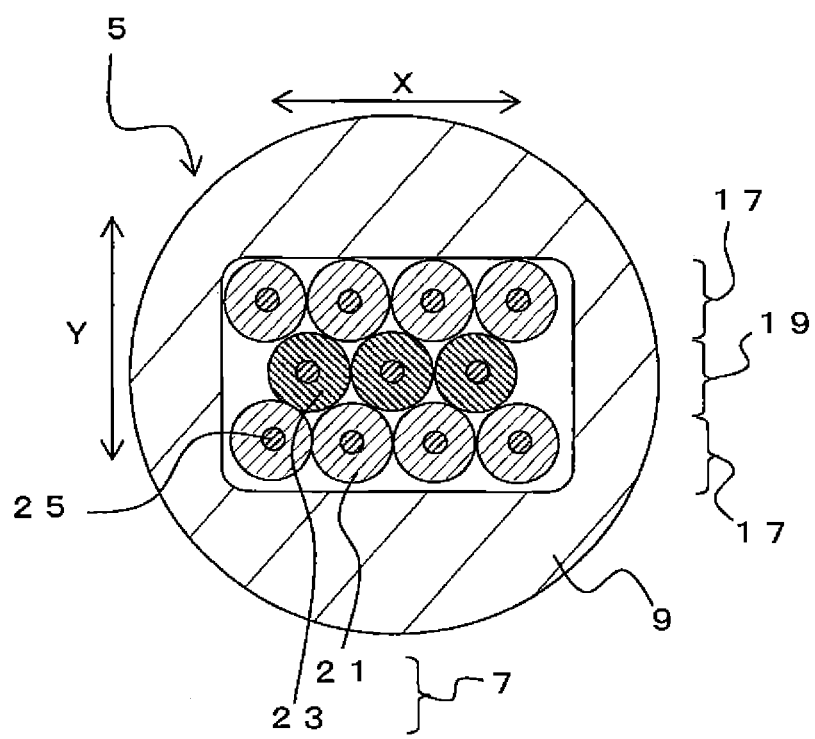
FIG. 2b is a cross sectional view showing the optical fiber connection structure 1 taken along the line B-B of FIG. 1.

Hereinafter, an optical fiber connection structure 1 will be described. FIG. 1 is a side view of the optical fiber connection structure 1, FIG. 2a is a cross sectional view of A-A line in FIG. 1, and FIG. 2b is a cross sectional view of B-B line in FIG. 1. The optical fiber connection structure 1 is a connection structure including a multicore fiber 3 connected with a bundle structure 5 in which a plurality of optical fibers 7 are bundled.

As shown in FIG. 2a, the multicore fiber 3 is inserted into a capillary 11 and fixed with resin or the like. The multicore fiber 3 includes a plurality of cores 15, which are arranged at predetermined intervals, and a clad 13, which covers around the cores 15. In the example shown in the drawing, the cores 15 are arranged in two rows, and four of the cores 15 are aligned at regular intervals in each of the rows (in a direction H in the drawing). The cores 15 are also arranged in a direction that is orthogonal to the arrangement direction of the cores 15 in the each row (in a direction V in the drawing). That is, the cores 15 are arranged in a lattice. The pitch of the cores 15 in each of the rows (the minimum pitch between the cores 15) is, for example, approximately 40 to 50 μm.

As shown in FIG. 2b, the bundle structure 5 is inserted into a capillary 9 and fixed with resin or the like. The bundle structure 5 includes the close-packed optical fibers 7 of the same diameter. In the presently described embodiments, the close-packed arrangement of the optical fibers 7 means that the adjacent optical fibers are arranged contacting with each other such that the lines connecting the centers of the adjacent optical fibers form substantially equilateral triangles. The optical fibers 7 are still considered to be in contact with each other when an adhesive layer of adhesive agent is formed between the optical fibers 7, provided that the thickness of the adhesive layer is 2 μm or less.

The optical fiber 7 includes signal light optical fibers 21 and dummy optical fibers 23. Thus, in the descriptions hereinafter, the optical fiber 7 will be a general term for the signal light optical fibers 21 and the dummy optical fibers 23. The signal light optical fiber 21 is an optical fiber that transmits signal lights. The dummy optical fiber 23 is an optical fiber that is not used for transmitting signal light. The dummy optical fiber 23 may not include a core and may be formed of a single material. The signal light optical fiber 21 and dummy optical fiber 23 having the same diameter are used.

On the surface facing the multicore fiber 3, end faces of the signal light optical fibers 21 and end faces of the dummy optical fibers 23 are disposed on the same surface. On the other hand, the length of the dummy optical fiber 23 is shorter than the length of the signal light optical fiber 21. For example, the length of the dummy optical fiber 23 exposed from the capillary 9 is about 10 to 20 cm, and the length of the signal light optical fiber 21 exposed from the capillary 9 is about 1 to 2 m. That is, the length of the dummy optical fiber 23 is at least half or less than half of the length of the signal light optical fiber 21.

The bundle structure 5 is configured such that a plurality of signal light optical fiber groups 17, in which a plurality of optical fibers including the signal light optical fiber 21 are aligned, and a dummy fiber group 19 including the dummy optical fibers 23 are stacked in multiple layers. The signal light optical fiber group 17 is configured with the signal light optical fibers 21 aligned in the mutually contacting direction (a direction X in the drawing). Similarly, the dummy fiber group 19 is configured with the dummy optical fibers 23 aligned in the mutually contacting direction (the direction X in the drawing). The signal light optical fiber groups 17 and the dummy fiber group 19 are stacked orthogonal to the alignment direction of the optical fibers 7 constituting the respective fiber groups (a direction Y in the drawing).

As mentioned above, in the diameter cross section, the optical fibers 7 are arranged close-packed. Thus, the signal light optical fiber group 17 and the dummy fiber group 19 are shifted from each other at a half pitch in the X direction and the optical fibers 7 of one of the groups are fitted in between the optical fibers 7 of the other group contacting with each other.

The dummy fiber group 19 is disposed between the signal light optical fiber group 17 and the signal light optical fiber group 17. Thus, the positions in X direction of the signal light optical fibers 21 constituting each of the signal light optical fiber groups 17 and facing each other over the dummy fiber group 19 correspond with each other. That is, the signal light optical fibers 21 of each of the signal light optical fiber groups 17 are also arranged in the direction orthogonal to the alignment direction of the optical fibers 7 in each of the fiber groups (X direction). In this way, cores 25 of the signal light optical fibers 21 are arranged in a lattice.

The number of the signal light optical fibers 21 is the same as the number of the cores 15 of the multicore fiber 3. In the presently described embodiments, the number of the signal light optical fibers 21 and the number of the cores 15 are not limited to the example shown in the drawings.

In addition, the pitch of the cores 25 of the signal light optical fibers 21 (the core pitch between the adjacent signal light optical fibers 21) is approximately equal to the pitch of the cores 15 of the multicore fiber 3. That is, the pitch of the cores 15 is approximately equal to the outer diameter of the signal light optical fiber 21.

The bundle structure 5 and the multicore fiber 3 are connected by bonding or fusion so that the cores 25 of the signal light optical fibers 21 are connected with the cores 15 of the multicore fiber 3. At this time, the mode field diameters of the cores 25 and the cores 15 are approximately the same. The multicore fiber 3, the signal light optical fibers 21, and the dummy optical fibers 23 are made of silica glass, for example.

Figure 3:
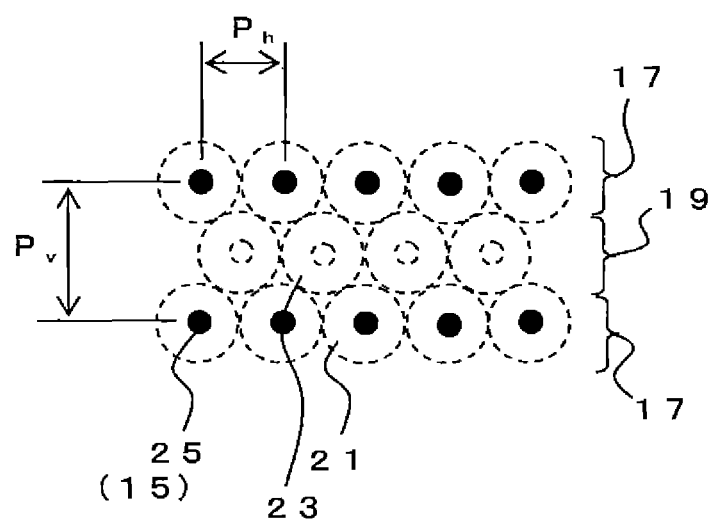
FIG. 3 is a drawing showing a first example of core arrangement of signal light optical fibers 21.

Next, the arrangement of the cores 25 of the signal light optical fibers 21 will be described in detail. FIG. 3 is a drawing showing the arrangement of the cores 25 of the signal light optical fibers 21. As mentioned above, the signal light optical fibers 21 are aligned in a row in the signal light optical fiber group 17. In addition, in the direction orthogonal to the alignment direction of the signal light optical fibers 21 of the signal light optical fiber group 17, the signal light optical fibers 21 of the other signal light optical fiber group 17 are arranged.

On this occasion, $P_h$ represents the pitch between the cores 25 in one of the signal light optical fiber group 17. Also, $P_v$ represents the pitch of the cores 25 in the direction traversing a plurality of the signal light optical fiber groups 17. In this case, a relationship:

$$P_v = 3^{(1/2)} \cdot P_h$$

is satisfied.

That is, the presently described embodiments are applicable when the arrangement of the cores 15 of the multicore fiber 3 satisfies the above formula with the H direction of the multicore fiber 3 in FIG. 2a corresponding to the X direction of the bundle structure 5 and the V direction of the multicore fiber 3 corresponding to the Y direction of the bundle structure 5.

Figure 4A:
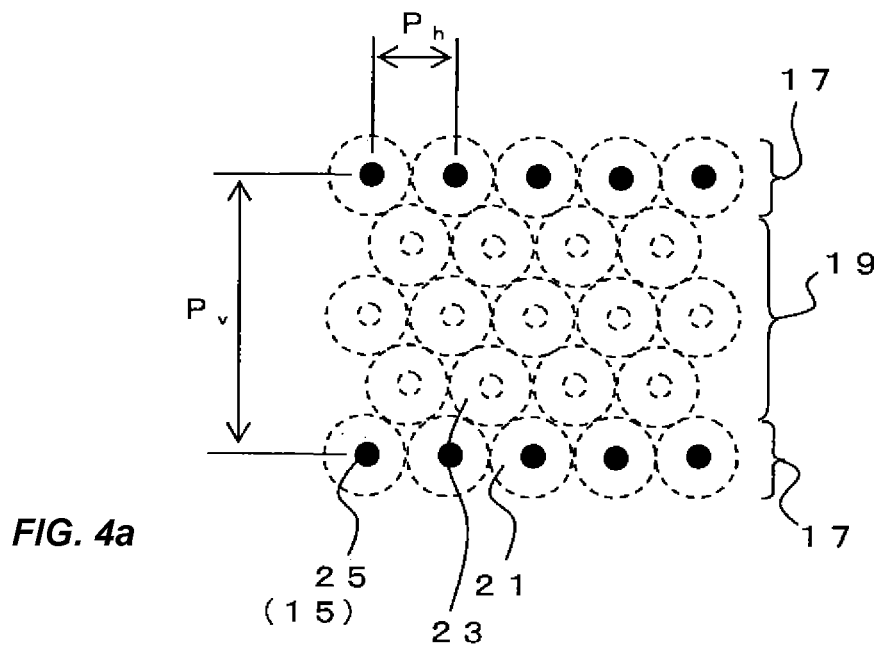
FIG. 4a is a drawing showing a second example of core arrangement of the signal light optical fibers 21.

By changing the arrangement of the signal light optical fibers 21 in the bundle structure 5, the presently described embodiments are also applicable for core arrangements that do not satisfy the above formula. For example, FIG. 4a is a drawing showing an arrangement in which the dummy fiber groups 19 are stacked in three rows and the signal light optical fiber groups 17 are arranged at the top and the bottom thereof.

In this case, a relationship:

$$P_v = 3^{(1/2)} \cdot P_h \cdot m \text{ (where } m=1,2,3,\ldots\text{)}$$

is satisfied.

As above, the presently described embodiments are also applicable when $P_v$ is an integer multiple of $3^{(1/2)} \cdot P_h$.

Figure 4B:
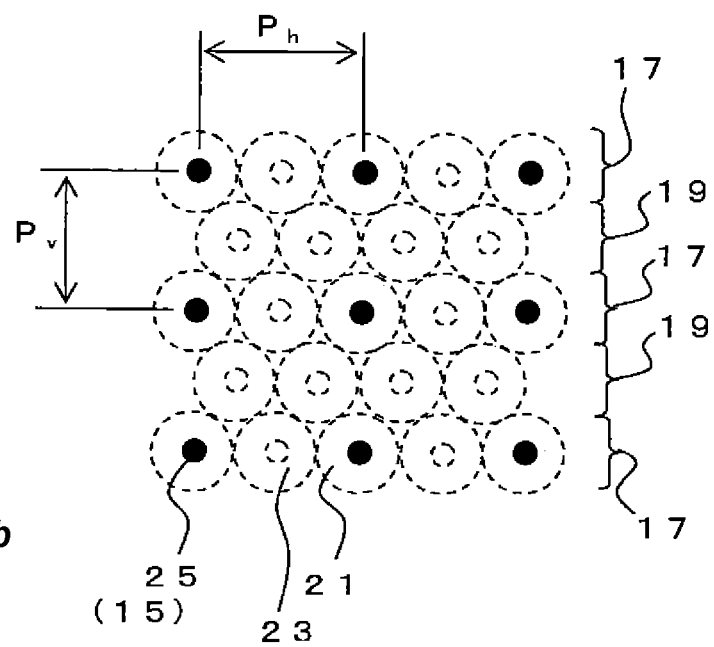
FIG. 4b is a drawing showing a third example of core arrangement of the signal light optical fibers 21.

Alternatively, FIG. 4b is a drawing showing a case in which the signal light optical fiber group 17 includes not only the signal light optical fibers 21 but also the dummy optical fibers 23. In the example shown in the drawing, the signal light optical fibers 21 and the dummy optical fibers 23 are alternately disposed.

In this case, a relationship:

$$P_v = 3^{(1/2)} \cdot P_h / n \text{ (where } n=1,2,3,\ldots\text{)}$$

is satisfied.

As above, the presently described embodiments are also applicable when $P_v$ is a (1/integer) multiple of $3^{(1/2)} \cdot P_h$.

That is, the presently described embodiments are applicable when the number of rows of the dummy fiber groups 19 interposed between the signal light optical fiber groups 17 is appropriately set (though it must be an odd number) and the number of the dummy optical fibers 23 interposed by the signal light optical fibers 21 in the signal light optical fiber group 17 is appropriately set such that the relationship:

$$P_v = 3^{(1/2)} \cdot P_h \cdot m / n \text{ (where } m,n=1,2,3,\ldots\text{)}$$

is satisfied. As above, the signal light optical fiber group 17 may include optical fibers other than the signal light optical fibers 21 as long as a plurality of the optical fibers, including the signal light optical fibers 21, are aligned.

Next, an example for a method of manufacturing the bundle structure 5 will be described. First, coating of a predetermined number of the optical fibers 7 is removed and the optical fibers 7 are inserted into the capillary 9. At this time, the optical fibers 7 are inserted into the capillary 9 in such a manner that the same length (about 10 mm for example) of the tips of the optical fibers 7 comes out of the end of the capillary 9. The capillary 9 is temporarily fixed to the optical fibers 7, for example.

The tips of the optical fibers 7 projecting from the end of the capillary 9 are dipped into adhesive agent that has been stored in a container beforehand. The adhesive agent is a solution-type adhesive agent, for example, which is a liquid in which a polymer solid such as synthetic resin is dissolved in water, alcohol, or organic solvent. With such a solution-type adhesive agent, adhesion can be obtained when the solute residue left after the vaporization of the solvent hardens.

The adhesive agent is preferably diluted further than a normally used concentration of the solute. This can decrease viscosity of the adhesive agent and also reduce the amount of the residual solute. This allows the adhesive layer between the optical fibers to be thin and the distances between the optical fibers 7 to be accurately uniform. In addition, since the adhesive agent shrinks in hardening, effects of the optical fibers pulling each other more closely can be obtained.

Here, the optical fibers 7 are inserted into the capillary 9 in a nearly substantially close-packed condition. However, before the tips of the optical fibers 7 are dipped into the adhesive agent, there are gaps formed between the optical fibers or, in other parts, the optical fibers are contacting with each other inside the capillary 9, and it is difficult to achieve a completely close-packed arrangement (having uniform core intervals).

However, the viscosity of the adhesive agent is low, and, when the adhesive agent is absorbed up into the gaps between the optical fibers by surface tension (capillarity phenomenon), the optical fibers 7 contacts with each other by mutual surface tension. That is, if a slightly uneven gap is formed between the optical fibers 7, the adhesive agent will be absorbed up into that gap and the optical fibers 7 will be in contact with each other.

This can make sure that the optical fibers 7 are placed in a close-packed arrangement and the adhesive agent is then hardened in this state to adhere the optical fibers 7 with each other.

In this way, the optical fibers 7 are adhered with each other in a close-packed condition, which are then adhered to the capillary 9. Then, the parts of the optical fibers 7 projecting from the capillary 9 and a part of the capillary 9 are polished. As above, the bundle structure 5 is formed. The method for manufacturing the bundle structure 5 is described in detail in WO2012/121320.

The arrangement of each of the optical fibers 7 can be found by introducing light from an end face of the optical fiber in the close-packed arrangement and detecting the light at the other end. Thus, it is possible to distinguish between the signal light optical fibers 21 and the dummy optical fibers 23 by leaving the optical fibers 7 corresponding to the arrangement of the signal optical fibers 21 and cutting the optical fibers 7 corresponding to the arrangement of the dummy optical fibers 23 at a predetermined length.

Figure 5:
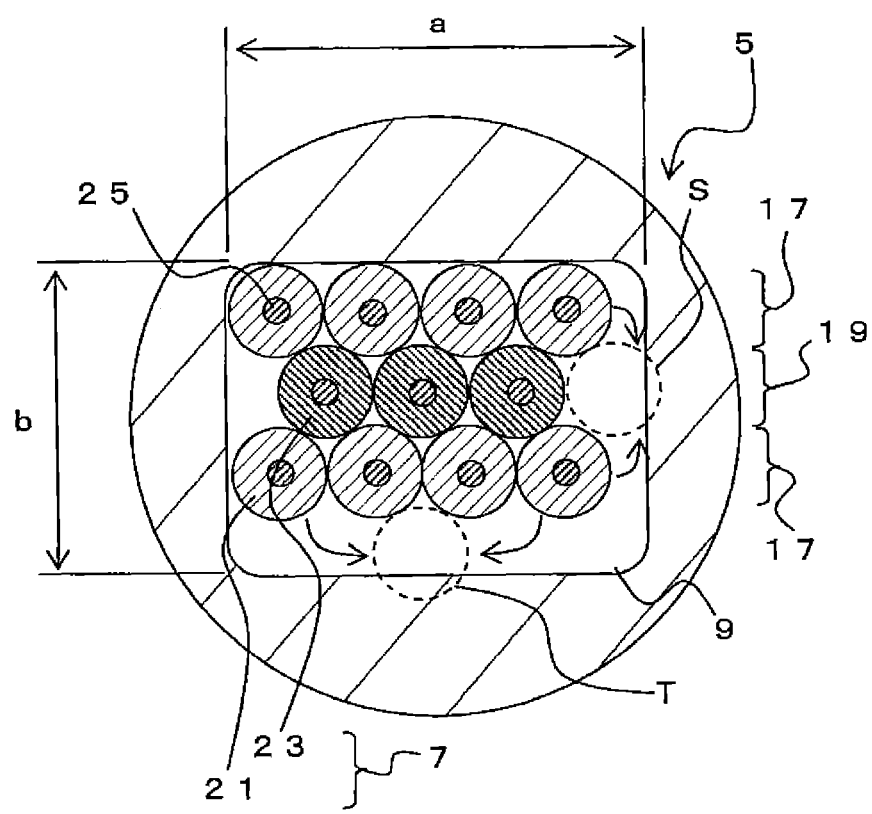
FIG. 5 is a cross sectional view showing a bundle structure 5.

FIG. 5 is a drawing showing a state in which the bundle structure 5 is inserted into a hole of the capillary 9. As mentioned above, the bundle structure 5 includes the optical fibers 7 that are disposed appropriately in a close-packed arrangement. If the arrangement of the optical fibers 7 in the bundle structure 5 is shifted here, the arrangement would be different from that of the cores 15 of the multicore fiber 3. Thus, it is necessary to prevent the close-packed optical fibers 7 from moving to other positions before the adhesive agent is hardened completely.

So, in the presently described embodiments, it is preferable that the shape (the dimension) of the hole of the capillary 9 is specified. The hole of the capillary 9 of the presently described embodiments are substantially rectangular (although with R forms at the corners, each of which has a radius of curvature that is small enough compared to the radius of the optical fiber 7). At this time, the alignment direction of the optical fibers 7 in each of the fiber groups (the X direction in FIG. 2b) is a width direction of the hole, and the direction orthogonal to the same (the Y direction in FIG. 2b) is a height direction of the hole.

In addition, d represents an outer diameter of the optical fiber 7, $n_h$ represents the maximum number of the optical fibers 7 aligned in the X direction in each of the fiber groups (in each row), and $n_v$ represents a total number of rows of the fiber groups stacked in the Y direction.

In this case, the width of the bundle structure 5 is:

$$n_h \cdot d$$

and the height of the bundle structure 5 is:

$$3^{(1/2)}/2 \cdot (n_v - 1) \cdot d + d$$

That is, the bundle structure 5 cannot be inserted into the hole unless:

the width of the hole: $a \geq n_h \cdot d$ and
the height of the hole: $b \geq (((n_v - 1) \cdot (3^{(1/2)})/2) + 1) \cdot d$ are satisfied.

Also, if the width a of the hole is too large, the optical fiber 7 positioned at the end of the width direction may move to another adjacent row (S in the drawing). Thus, it is necessary to prevent this movement. In this case, it is possible to prevent the optical fiber 7 from moving to another row if a relationship:

$$a<(n_h+\tfrac{1}{2})\cdot d$$

is satisfied.

Also, if the height b of the hole is too large, the optical fiber 7 positioned at the end of the height direction may move to another adjacent row (T in the drawing). Thus, it is necessary to prevent this movement. In this case, it is possible to prevent the optical fiber 7 from moving to another row if a relationship:

$$b<(((n_v\cdot(3^{(1/2)}))/2)+1)\cdot d$$

is satisfied.

That is, the moving of the optical fibers 7 in the bundle structure 5 can be prevented if the relationships:

$$n_h\cdot d\leq a<(n_h+\tfrac{1}{2})\ d$$

and $$(((n_v-1)\cdot(3^{(1/2)})/2)+1)\cdot d\leq b<(((n_v\cdot(3^{(1/2)}))/2)+1)\cdot d$$

are satisfied.

Figure 6:
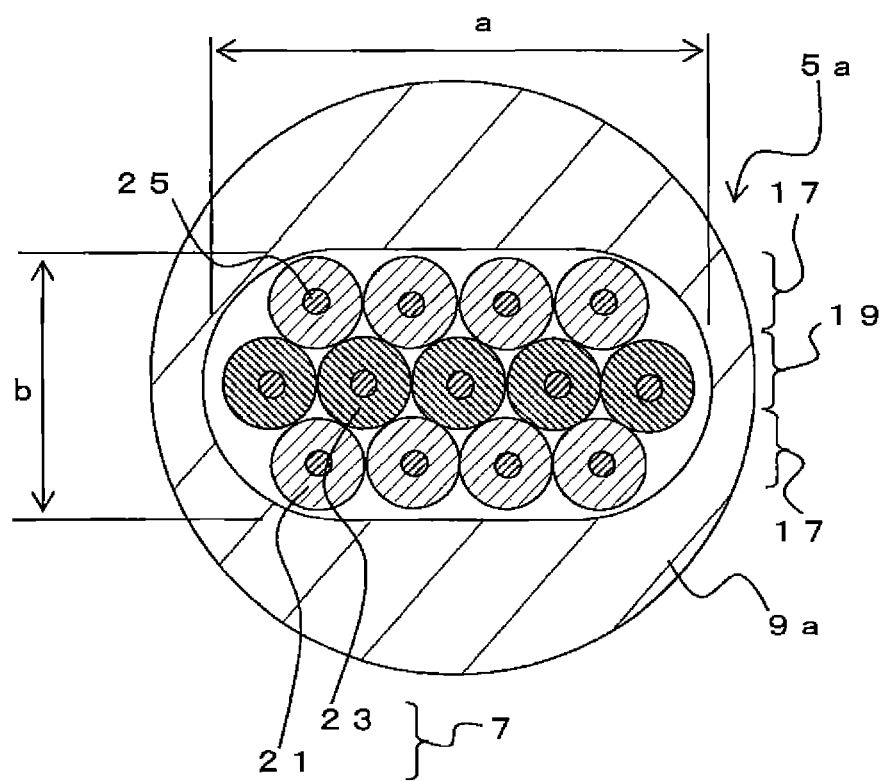

Although the hole in the example is made in such a manner that the center axis of the hole substantially coincides with the center axis of the capillary 9, the presently described embodiments re not limited thereto. In addition, the above-mentioned relationships are not limited to the case in which the hole is in a substantially rectangular shape. For example, as shown in FIG. 6, the relationships can also be applied to a capillary 9a having a hole in a substantially elliptical shape. Here, an elliptical shape is considered as a rectangle with rounded corners, in which straight lines connect semi-circular shapes at both ends in the width direction. In this case, the moving of the optical fibers 7 in a bundle structure 5a can be prevented if the above-mentioned relationships are satisfied when the length in the longitudinal direction of the ellipse (the width direction) is a and the length in the short end direction of the ellipse (the height direction) is b.

Figure 7A:
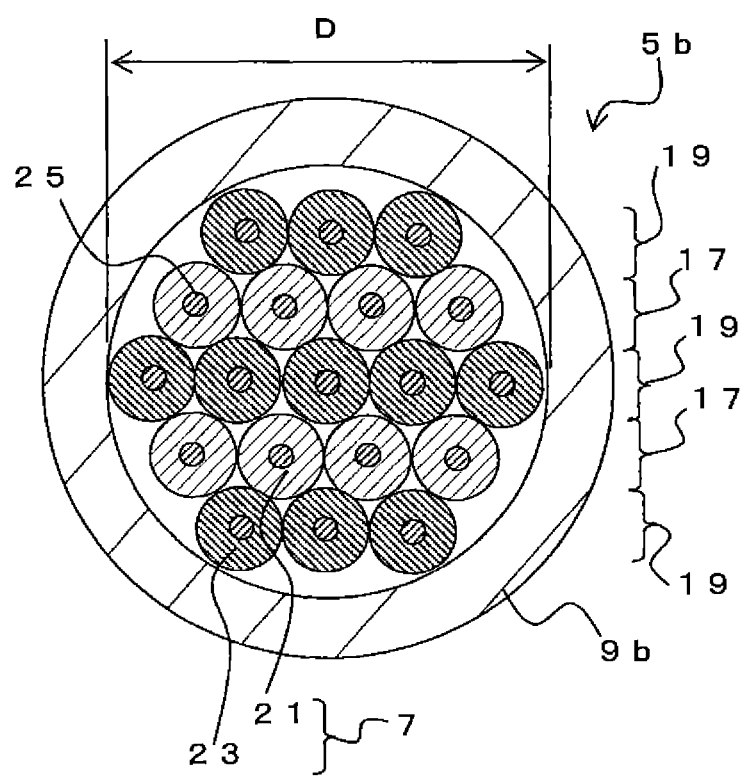
FIG. 7a is a cross sectional view showing a bundle structure 5b.
Figure 7B:
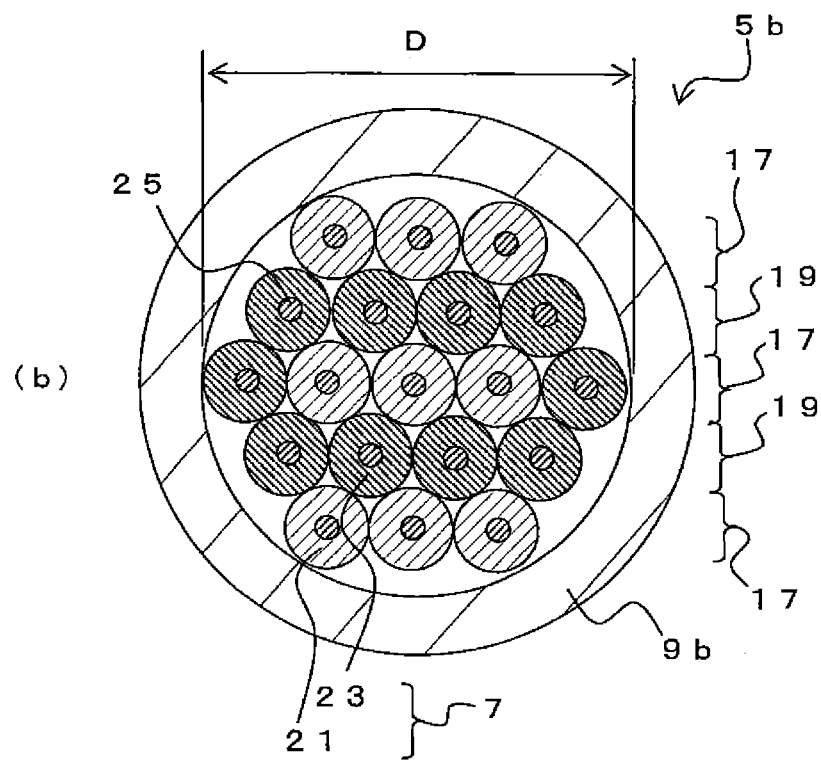
FIG. 7b is a cross sectional view showing the bundle structure 5b.

Alternatively, as shown in FIGS. 7a and 7b, the relationships can also be applied to a capillary 9b having a hole in a substantially circular shape. FIG. 7a is a drawing showing an example in which the signal light optical fibers 21 are arranged in 2×4, and FIG. 7b is a drawing showing an example in which the signal light optical fibers 21 are arranged in 3×3. These cases can be determined as below. D represents an inner diameter of the hole of the capillary 9. Also, as shown in the drawings, the bundle structure 5 includes nineteen optical fibers in a close-packed arrangement of a substantially hexagon shape. In this case, the maximum diameter (the diameter of a circumscribed circle) of a bundle structure 5b is 5d.

On the other hand, if D is too large, the moving of the optical fibers 7 may occur as well as the gaps between the capillary 9b and the bundle structure 5b may increase. Thus, it is preferable that D is in a range of:

$$5d\leq D<5.5d$$

If, for example, one more layer is added so as to have a bundle structure including thirty seven optical fibers in a close-packed arrangement of a substantially hexagon shape, whose illustration is omitted, D is preferably in a range of:

$$7d\leq D<7.4d$$

to insert the bundle structure into the hole and to maintain an appropriate gap between the capillary 9b and the bundle structure 5b.

As described above, according to the present embodiments, it is possible to obtain a bundle structure that can provide fan out for the multicore fiber having the cores 15 arranged in a lattice. At this time, each of the optical fibers 7 forming the bundle structure are disposed in a close-packed arrangement so that each of the optical fibers 7 can be arranged at a desirable pitch with certainty. Thus, there is no need to use a multi-hole capillary.

Also, by optimizing the dimension of the hole of the capillary appropriately according to the bundle structure, it is possible to prevent the optical fibers 7 from moving within the hole.

Also, by setting the arrangement of the signal light optical fibers 21 in the close-packed arrangement appropriately, the present embodiments can be applied to core arrangements of various positional relations.

Although the embodiments have been described referring to the attached drawings, the technical scope of the claims is not limited to the embodiments described above. It is obvious that persons skilled in the art can think out various examples of changes or modifications within the scope of the technical idea disclosed in the claims, and it will be understood that they naturally belong to the technical scope of the presently described embodiments.

For example, although the capillary 9 and the like are integrally formed in the above-mentioned embodiments, the capillary in any types of forms is applicable as long as the bundle structure can be held.

Figure 8A:
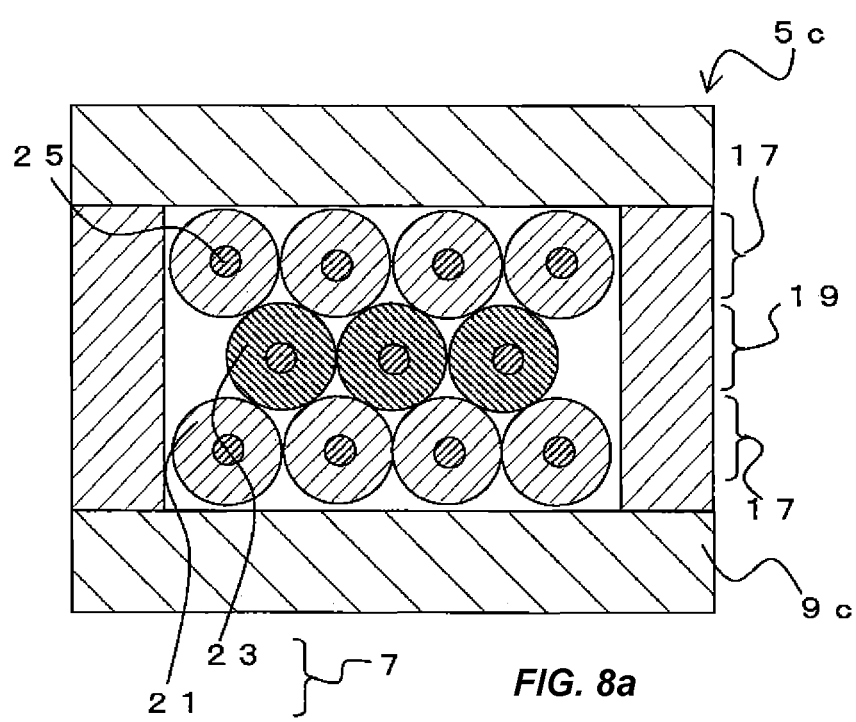
FIG. 8a is a cross sectional view showing a bundle structure 5c.

For example, as shown in FIG. 8a, a bundle structure 5c may be inserted into a capillary 9c. The capillary 9c is separated into a bottom portion, side portions, and a lid portion, which are assembled together so that a space (equivalent to a hole) is formed. Thus, the bundle structure 5c can be inserted into this space (hole).

Figure 8B:
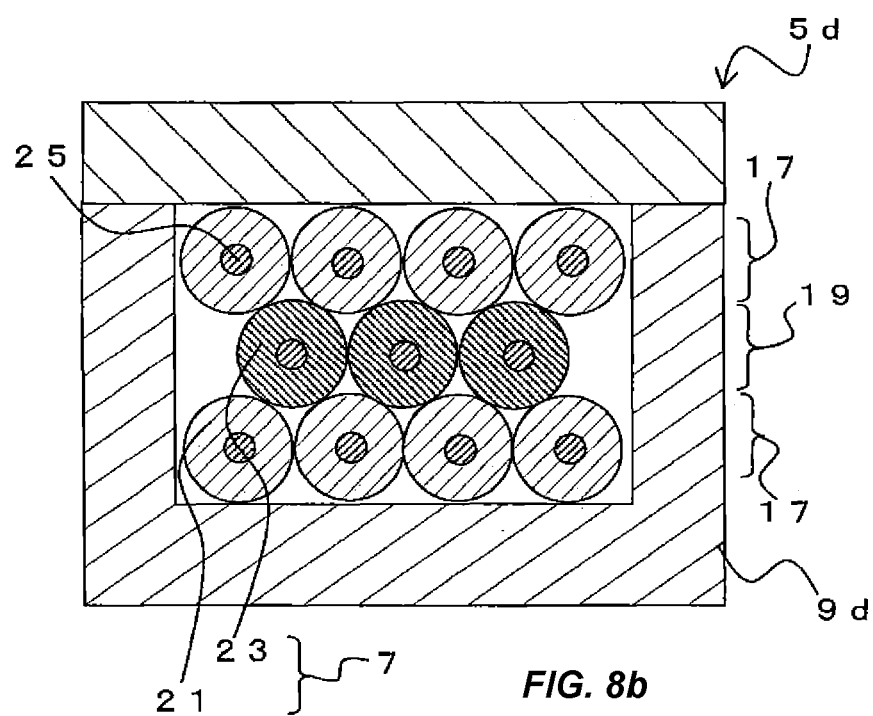
FIG. 8b is a cross sectional view showing a bundle structure 5d.

Alternatively, as shown in FIG. 8b, a bundle structure 5d may be inserted into a capillary 9d. The capillary 9d is separated into a main body portion having a ditch formed and a lid portion, which are assembled together so that a space (equivalent to a hole) is formed by the ditch portion. Thus, the bundle structure 5d can be inserted into this space (hole).

Figure 9:
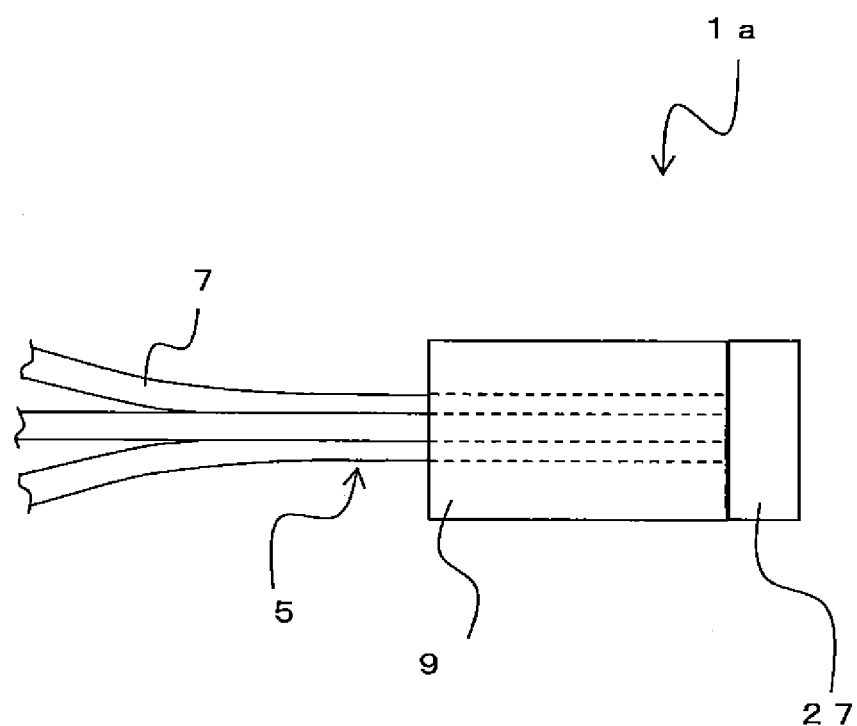

Furthermore, the optical fiber connection structure is not limited to a connection of a bundle structure and a multicore fiber. For example, as in an optical fiber connection structure 1a shown in FIG. 9, the bundle structure 5 may be connected with a light receiving/emitting element 27. If the light receiving/emitting portion of the light receiving/emitting element 27 like this is arranged in a lattice, any of the bundle structures can be applied.

What is claimed is:

1. An optical fiber bundle structure comprising
a plurality of optical fibers; and
a capillary that holds a plurality of the optical fibers, wherein
a shape of a hole of the capillary is substantially circular;
the optical fiber includes a signal light optical fiber and a dummy fiber having the same diameter as the signal light optical fiber, the dummy fiber being shorter than the signal light optical fiber;
when the optical fibers are disposed in a close-packed arrangement at a cross section in a diameter direction of the optical fiber bundle structure, and a direction in which adjacent optical fibers are in contact with each other is an X direction and a direction that is perpendicular to the X direction is a Y direction, a signal light optical fiber group, in which a plurality of the optical fibers including the signal light optical fibers are aligned in the X direction, and a dummy fiber group, in which only a plurality of the dummy fibers are aligned in the X direction, are alternatingly stacked in multiple layer in the Y direction; and the signal light optical fibers are disposed at predetermined intervals in the X direction and are also disposed at predetermined intervals in the Y direction, and the signal light optical fibers are arranged in a lattice in a diameter cross section.

2. The optical fiber bundle structure according to claim 1, wherein:
all of nineteen of the optical fibers are disposed in a close-packed arrangement in a substantially hexagonal shape in the capillary; and
D is in a range of:

$$5d \leq D < 5.5d$$

wherein d represents a diameter of the optical fiber and D represents an inner diameter of the hole of the capillary.

3. The optical fiber bundle structure according to claim 1, wherein:
all of thirty seven of the optical fibers are disposed in a close-packed arrangement in a substantially hexagonal shape in the capillary; and
D is in a range of:

$$7d \leq D < 7.4d$$

wherein d represents a diameter of the optical fiber and D represents an inner diameter of the hole of the capillary.

4. The optical fiber bundle structure according to claim 1, wherein:
the signal light optical fiber group includes the signal light optical fibers and the dummy fibers; and
the signal light optical fibers are disposed at predetermined intervals in the X direction.

5. An optical fiber connection structure connecting a multicore fiber and an optical fiber bundle structure, wherein:
the multicore fiber includes a plurality of cores and the cores are disposed at predetermined intervals in an H direction and are also disposed at predetermined intervals in a V direction, which is approximately perpendicular to the H direction, in a lattice;
the optical fiber bundle structure comprises a plurality optical fibers and a capillary that holds a plurality of the optical fibers;
a shape of a hole of the capillary is substantially circular;
the optical fibers include signal light optical fibers and dummy fibers having the same diameter as the signal light optical fibers;
when the optical fibers are disposed in a close-packed arrangement at a cross section in a diameter direction of the optical fiber bundle structure, and a direction in which adjacent optical fibers are in contact with each other is an X direction and a direction that is perpendicular to the X direction is a Y direction, a signal light optical fiber group, in which a plurality of the optical fibers including the signal light optical fibers are aligned in the X direction, and a dummy fiber group, in which only a plurality of the dummy fibers are aligned in the X direction, are alternatingly stacked in a multiple layer in the Y direction;

the signal light optical fibers are disposed at predetermined intervals in the X direction and are also disposed at predetermined intervals in the Y direction, and the signal light optical fibers are arranged in a lattice in a diameter cross section; and the cores of the multicore fiber are optically connected with cores of the signal light optical fibers in the signal light optical fiber group by corresponding the X direction with the H direction as well as corresponding the Y direction with the V direction.

6. An optical fiber connection structure connecting a light receiving/emitting element and an optical fiber bundle structure, wherein
the light receiving/emitting element includes a plurality of light receiving/emitting portions and the light receiving/emitting portions are disposed at predetermined intervals in an H direction and are also disposed at predetermined intervals in a V direction, which is approximately perpendicular to the H direction, in a lattice;
the optical fiber bundle structure comprises a plurality optical fibers and a capillary that holds a plurality of the optical fibers;
a shape of a hole of the capillary is substantially circular;
the optical fibers include signal light optical fibers and dummy fibers having the same diameter as the signal light optical fibers;
when the optical fibers are disposed in a close-packed arrangement at a cross section in a diameter direction of the optical fiber bundle structure, and a direction in which adjacent optical fibers are in contact with each other is an X direction and a direction that is perpendicular to the X direction is a Y direction, a signal light optical fiber group, in which a plurality of the optical fibers including the signal light optical fibers are aligned in the X direction, and a dummy fiber group, in which only a plurality of the dummy fibers are aligned in the X direction, are alternatingly stacked in a multiple layer in the Y direction;
the signal light optical fibers are disposed at predetermined intervals in the X direction and are also disposed at predetermined intervals in the Y direction, and the signal light optical fibers are arranged in a lattice in a diameter cross section; and
the light receiving/emitting portions of the light receiving/emitting element are optically connected with cores of the signal light optical fibers in the signal light optical fiber group by corresponding the X direction with the H direction as well as corresponding the Y direction with the V direction.

* * * * *